(12) United States Patent
Yoshino

(10) Patent No.: US 10,480,568 B2
(45) Date of Patent: Nov. 19, 2019

(54) FOIL BEARING

(71) Applicant: NTN CORPORATION, Osaka (JP)

(72) Inventor: Masato Yoshino, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/767,671

(22) PCT Filed: Oct. 12, 2016

(86) PCT No.: PCT/JP2016/080271
§ 371 (c)(1),
(2) Date: Apr. 12, 2018

(87) PCT Pub. No.: WO2017/065181
PCT Pub. Date: Apr. 20, 2017

(65) Prior Publication Data
US 2019/0078613 A1 Mar. 14, 2019

(30) Foreign Application Priority Data

Oct. 16, 2015 (JP) .................. 2015-204823
Oct. 16, 2015 (JP) .................. 2015-204826

(51) Int. Cl.
*F16C 17/02* (2006.01)
*F16C 27/02* (2006.01)
(Continued)

(52) U.S. Cl.
CPC .............. *F16C 17/024* (2013.01); *F02C 7/06* (2013.01); *F16C 27/02* (2013.01);
(Continued)

(58) Field of Classification Search
CPC .... F16C 17/024; F16C 27/02; F16C 32/0607; F16C 32/0633; F16C 43/02; F16C 25/162;
(Continued)

(56) References Cited

U.S. PATENT DOCUMENTS 4,133,585 A  1/1979 Licht
4,178,046 A * 12/1979 Silver ................... F16C 17/024
                                                                384/103
(Continued)

FOREIGN PATENT DOCUMENTS

DE       3331503 A1 *  4/1985 ............ F16C 17/024
JP       54-28958       3/1979
(Continued)

OTHER PUBLICATIONS

International Preliminary Report on Patentability and Written Opinion of the International Searching Authority dated Apr. 17, 2018 in International (PCT) Application No. PCT/JP2016/080271.
(Continued)

*Primary Examiner* — Marcus Charles
(74) *Attorney, Agent, or Firm* — Wenderoth, Lind & Ponack, L.L.P.

(57) ABSTRACT

Particles (23) are supplied to a bearing gap of a foil bearing. A step (24) is formed in a top foil portion (12*a*1), to thereby generate an air flow from both end portions (121 and 122) in a direction (N) along a surface of the top foil portion (12*a*1) and orthogonal to a rotation direction (R) of a shaft (6) toward a region between the both end portions.

16 Claims, 10 Drawing Sheets

(51) Int. Cl.
  *F01D 25/16* (2006.01)
  *F16C 32/06* (2006.01)
  *F16C 33/10* (2006.01)
  *F02C 7/06* (2006.01)
  *F04D 29/057* (2006.01)
  *F16C 43/02* (2006.01)

(52) U.S. Cl.
  CPC ...... *F16C 32/0607* (2013.01); *F16C 32/0633* (2013.01); *F16C 33/1095* (2013.01); *F01D 25/166* (2013.01); *F04D 29/057* (2013.01); *F05D 2240/54* (2013.01); *F16C 43/02* (2013.01); *F16C 2240/60* (2013.01); *F16C 2300/22* (2013.01); *F16C 2300/54* (2013.01); *F16C 2360/23* (2013.01); *F16C 2360/24* (2013.01)

(58) Field of Classification Search
  CPC .............. F16C 2360/23; F16C 2360/24; F16C 25/166; F01D 25/162; F04D 29/057; F05D 2240/54; F02C 7/06
  USPC ...... 384/103, 105, 106, 124, 125; 29/898.02
  See application file for complete search history.

(56) References Cited

U.S. PATENT DOCUMENTS

| | | | | |
|---|---|---|---|---|
| 4,743,126 | A * | 5/1988 | Soum | F16C 17/024 29/898.02 |
| 5,529,398 | A * | 6/1996 | Bosley | F01D 25/168 384/105 |
| 8,371,799 | B2 * | 2/2013 | Spathias | F04D 29/056 415/1 |
| 2007/0211970 | A1 * | 9/2007 | Nagata | F16C 17/024 384/104 |
| 2010/0029517 | A1 * | 2/2010 | Oboodi | F16C 33/12 508/108 |
| 2014/0169707 | A1 | 6/2014 | Yoshino | |
| 2014/0226925 | A1 * | 8/2014 | Yoshino | F16C 17/024 384/103 |
| 2015/0337894 | A1 * | 11/2015 | Yoshino | F16C 17/024 384/103 |
| 2016/0265437 | A1 * | 9/2016 | Yoshino | F16C 17/024 |
| 2016/0312655 | A1 | 10/2016 | Yoshino et al. | |
| 2016/0356310 | A1 | 12/2016 | Yoshino et al. | |

FOREIGN PATENT DOCUMENTS

| | | | | |
|---|---|---|---|---|
| JP | 03028519 | A * | 2/1991 | ............ F16C 17/035 |
| JP | 2012-092967 | | 5/2012 | |
| JP | 2015-113926 | | 6/2015 | |
| WO | 2015/087677 | | 6/2015 | |
| WO | WO-2015141806 | A1 * | 9/2015 | ............ F16C 17/042 |

OTHER PUBLICATIONS

Extended European Search Report dated May 13, 2019 in corresponding European Patent Application No. 16855434.3.
International Search Report dated Jan. 10, 2017 in International (PCT) Application No. PCT/JP2016/080271.

* cited by examiner

FOIL BEARING

The present application is a U.S. National Stage Application based on International (PCT) Application No. PCT/JP2016/080271, filed on Oct. 12, 2016.

TECHNICAL FIELD

The present invention relates to a foil bearing.

BACKGROUND ART

A main shaft of a turbo-machine (for example, a gas turbine or a turbocharger) is rotated at high speed under a high-temperature environment. Further, there is a case in which the turbo-machine has a difficulty in being provided with a separate auxiliary machine for oil circulation from the viewpoints of energy efficiency, and there is also a case in which shear resistance of a lubricating oil may be a factor for inhibiting high-speed rotation of the main shaft. Therefore, as a bearing for supporting the main shaft of the turbo-machine, an air dynamic pressure bearing using air as pressure-generating fluid is often used in place of a rolling bearing or a dynamic pressure bearing using oil lubrication.

In the air dynamic pressure bearing, both a bearing surface on a rotary side and a bearing surface on a stationary side are generally constructed of rigid bodies. However, in this type of air dynamic pressure bearing, when management of a gap width of a bearing gap formed between both the bearing surfaces is insufficient, self-excited whirling called a "whirl" becomes more liable to occur in the shaft upon exceeding a stability limit. Thus, in a general air dynamic pressure bearing, the gap width of the bearing gap needs to be managed with high accuracy in order to stably exhibit bearing performance. However, under an environment in which a temperature change is large as in the turbo-machine, the gap width of the bearing gap is easily varied under the influence of thermal expansion. Therefore, there is difficulty in stably exhibiting the bearing performance.

There has been known a foil bearing as a bearing which is less liable to cause the whirl and enables management of a gap width of a bearing gap to be performed easily even under the environment in which a temperature change is large. The foil bearing has a bearing surface which is constructed of a flexible metal thin plate (foil) having low rigidity against bending. The foil bearing allows flexure of the bearing surface, to thereby support a load. The foil bearing has a feature in that the bearing gap is automatically adjusted to an appropriate width in accordance with, for example, an operation condition. For example, in Patent Literature 1 described below, there is disclosed an example of a radial foil bearing configured to support a radial load.

Incidentally, in the foil bearing, particularly during low-speed rotation of the shaft, rigidity (pressure) of the air film formed in the bearing gap is not sufficiently increased, and hence the bearing surfaces repeatedly come into slide contact with each other. In order to suppress abrasion of the bearing surfaces and increase in rotational torque due to such slide contact, in Patent Literature 1, there is disclosed that a coating film such as a DLC film, a titanium aluminum nitride film, or a molybdenum disulfide film is formed on a surface of each foil forming the bearing gap with a shaft.

CITATION LIST

Patent Literature 1: JP 2012-92967 A

SUMMARY OF INVENTION

Technical Problem

As illustrated in FIG. 22, during stop of a shaft, an outer peripheral surface of a shaft 6 and a coating film 21 formed on a surface of a foil 12 are in a state of being held in contact with each other in a broad range. Even when rotation of the shaft 6 is started in such a state, air is not smoothly drawn to a part between the outer peripheral surface of the shaft 6 and the coating film 21 which are in a state of being held in close contact with each other. Therefore, sufficient pressure is not generated in a wedge-shaped space, thereby causing a problem in that floating of the shaft 6 is delayed. The delay in floating of the shaft causes various defects such as energy loss.

Therefore, it is an object of the present invention to provide a foil bearing capable of achieving prompt floating of a shaft at the time of activation. Further, it is also an object of the present invention to provide a foil bearing capable of maintaining the effect for a long period of time.

Solution to Problem

In order to solve the above-mentioned problem, according to one embodiment of the present invention, there is provided a foil bearing, comprising: a top foil portion having a bearing surface which forms a bearing gap with a shaft to be supported; and a support portion, which is arranged on a back side of the top foil portion, and is configured to elastically support the top foil portion, wherein the foil bearing is configured to support relative rotation of the shaft in a non-contact state with fluid pressure generated in the bearing gap, wherein particles are supplied to the bearing gap, and wherein the top foil portion comprises a fluid control portion which is configured to generate a fluid flow from both end portions of the top foil portion in a direction along a surface of the top foil portion and orthogonal to the relative rotation direction toward a region between the both end portions.

When the particles are supplied to the bearing gap as described above, during stop of a rotary side member (for example, the shaft), the particles interposed between two surfaces opposed to each other through the bearing gap function as a spacer. Thus, a minute gap is formed between the two surfaces. In this case, air is likely to be drawn into the minute gap from a timing immediately after start of rotation of the shaft. Therefore, fluid dynamic pressure can be promptly generated in the wedge-shaped space, thereby being capable of allowing the shaft to float in an early stage.

Further, the fluid control portion generates the fluid flow from the both end portions of the top foil portion toward a region between the both end portions in the bearing gap, thereby being capable of preventing leakage of the particles to an outside of the bearing gap. Thus, even when the foil bearing is used for a long period of time, the particles in the bearing gap are not depleted, thereby being capable of attaining the above-mentioned effect exerted by the particles for a long period of time.

The fluid control portion may be formed of a step in a width direction of the bearing gap. The step may be formed by elastically deforming the top foil portion in conformity with a shape of the support portion. In this case, the flow direction of the fluid may be controlled by suitably changing the shape of the fluid control portion (step) through adjustment of a support reaction force at portions of the support portion.

For example, foils may be arranged at a plurality of positions in the relative rotation direction, the foils may each have the top foil portion and an under-foil portion configured to support an adjacent top foil portion from a back side, and the support portion may be formed of the under-foil portion.

When a cutout portion which is recessed in the relative rotation direction is formed at a rear end of the under-foil portion, the top foil portion is elastically deformed in conformity with a shape of the cutout portion, thereby being capable of controlling the shape of the fluid control portion (step portion) by only changing the shape of the cutout portion.

Further, according to one embodiment of the present invention, there is provided a foil bearing, comprising: a top foil portion having a bearing surface which forms a bearing gap with a shaft to be supported; and a support portion, which is arranged on a back side of the top foil portion, and is configured to elastically support the top foil portion, wherein the foil bearing is configured to support relative rotation of the shaft in a non-contact state with fluid pressure generated in the bearing gap, wherein particles are supplied to the bearing gap, and wherein the top foil portion comprises a surface having a particle collecting portion which forms a recessed sectional shape both during rotation and during stop of the rotation.

When the particles are supplied to the bearing gap as described above, during stop of a rotary side member (for example, the shaft), the particles interposed between two surfaces opposed to each other through the bearing gap function as a spacer. Thus, a minute gap is formed between the two surfaces. In this case, air is likely to be drawn into the minute gap from a timing immediately after start of rotation of the shaft. Therefore, fluid dynamic pressure may be promptly generated in the wedge-shaped space, thereby being capable of allowing the shaft to float in an early stage.

During the rotation of the shaft, the particles are collected to the particle collecting portion having the recessed sectional shape. With this configuration, the total number of the particles flowing in the bearing gap is reduced, thereby being capable of preventing an unstable behavior of the shaft caused by, for example, biting of the particles, or being capable of reducing leakage of the particles to an outside of the bearing gap. When the rotation of the shaft is stopped, the shaft having been eccentric immediately before the stop is brought into contact with the particles accumulated in the particle collecting portion. Thus, at the time of complete stop of the shaft, a large number of particles can be caused to adhere to the outer peripheral surface of the shaft. With this configuration, the particles can be reliably interposed at the contact portion between the top foil portion and the shaft after the complete stop.

As described above, according to the present invention, a minute gap can be formed by reliably interposing the particles between the two surfaces forming the bearing gap at the time of stop of the shaft. Therefore, the fluid dynamic pressure can be promptly generated in the wedge-shaped space, thereby being capable of allowing the shaft to float in an early stage, and being capable of promptly shifting the member on the rotary side into a normal rotation state.

It is preferred that the particle collecting portion be provided in a vicinity of a maximum pressure generating portion of the top foil portion and on a side opposite to a rotation direction side with respect to the maximum pressure generating portion. The maximum pressure generating portion of the top foil portion is a region having a narrow bearing gap. Therefore, through employment of the above-mentioned configuration, at the time of stop of the shaft, the shaft is likely to be brought into contact with the particles accumulated in the particle collecting portion.

The particle collecting portion described above may be formed by partially reducing a thickness of the top foil portion.

Through formation of protrusions and recesses at the end portion of the particle collecting portion on the rotation direction side, the amount of accumulation of the particles in the particle collecting portion can be increased.

In the foil bearing, foils may be arranged at a plurality of positions in the relative rotation direction, the foils may each have the top foil portion and an under-foil portion configured to support an adjacent top foil portion from a back side, and the support portion may be formed of the under-foil portion.

In the above-mentioned foil bearing, when a particle diameter of the particles is set smaller than a minimum width of the bearing gap, the particles are less liable to be bitten into the minimum width portion of the bearing gap during rotation of the shaft. Therefore, the unstable behavior of the shaft can be suppressed.

Further, in the above-mentioned foil bearing, the following configuration is assumed. That is, the top foil portion is arranged at each of a plurality of positions in the relative rotation direction. A large-width portion which is formed by setting a width of the bearing gap to be larger than a minimum width of the bearing gap is formed at a boundary portion between adjacent top foil portions. A flow hole which penetrates through front and back sides of the top foil portion and is opened to the large-width portion is formed in the top foil portion on the side opposite to the rotation direction side with respect to the large-width portion. With this configuration, the particles accumulated on the top foil portion can be blown by the flow of fluid jetting through the flow hole. Therefore, the particles can be reused by causing the particles to flow in the bearing gap.

Advantageous Effects of Invention

The fluid control portion, which is configured to generate fluid flow from both end portions of the top foil portion in the direction along the surface of the top foil portion and orthogonal to the relative rotation direction toward the region between the both end portions, is formed at the top foil portion, thereby being capable of promptly generating the fluid dynamic pressure in the wedge-shaped space, and allowing the shaft to float in an early stage. Therefore, the member on the rotary side can be promptly shifted to the normal rotation state. Further, leakage of the particles to the outside of the bearing gap can be prevented, thereby being capable of stably attaining the above-mentioned effect for a long period of time.

DESCRIPTION OF EMBODIMENTS

Now, description is made of embodiments of the present invention with reference to the drawings.

Figure 1:
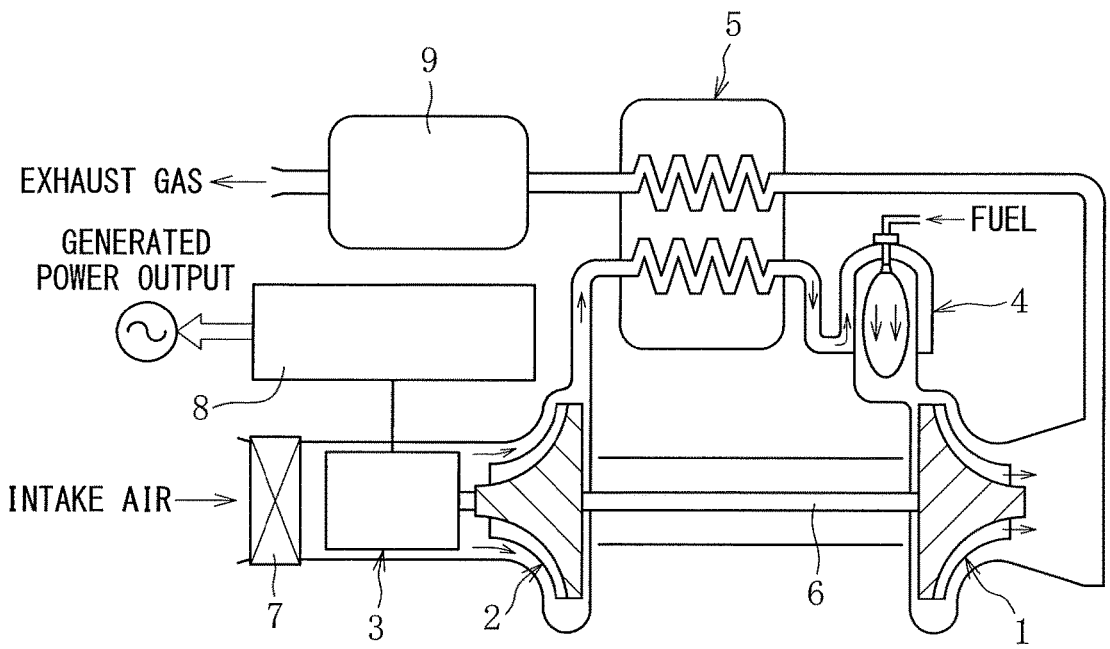
FIG. 1 is a view for illustrating a schematic configuration of a micro gas turbine.

In FIG. 1, a configuration of a gas turbine device which is called a "micro gas turbine" is conceptually illustrated as one example of a turbo-machine. This gas turbine device comprises, as a main configuration, a turbine 1 forming a blade cascade, a compressor 2, a power generator 3, a combustor 4, and a regenerator 5. The turbine 1 and the compressor 2 are mounted to a shaft 6 extending in a horizontal direction to construct a rotor on a rotary side together with the shaft 6. One end of the shaft 6 in an axial direction thereof is coupled to the power generator 3. When this micro gas turbine is operated, air is taken in through an intake port 7. The taken-in air is compressed by the compressor 2 and heated by the regenerators, and thereafter sent to the combustor 4. The combustor 4 mixes fuel into the compressed and heated air and combusts mixture of the fuel and the air, to thereby generate high-temperature and high-pressure gas and rotate the turbine 1 with this gas. When the turbine 1 is rotated, a rotary force thereof is transmitted to the power generator 3 through the shaft 6, to thereby drive the power generator 3 to rotate. Power generated by driving the power generator 3 to rotate is output through an inverter 8. Temperature of the gas after the rotation of the turbine 1 is relatively high. Thus, the gas is delivered to the regenerator 5 to perform heat exchange with compressed air before combustion, thereby reusing the heat of the gas after combustion. The gas after completion of the heat exchange in the regenerator 5 passes through a waste heat collecting device 9, and is then discharged as exhaust gas.

Figure 2:
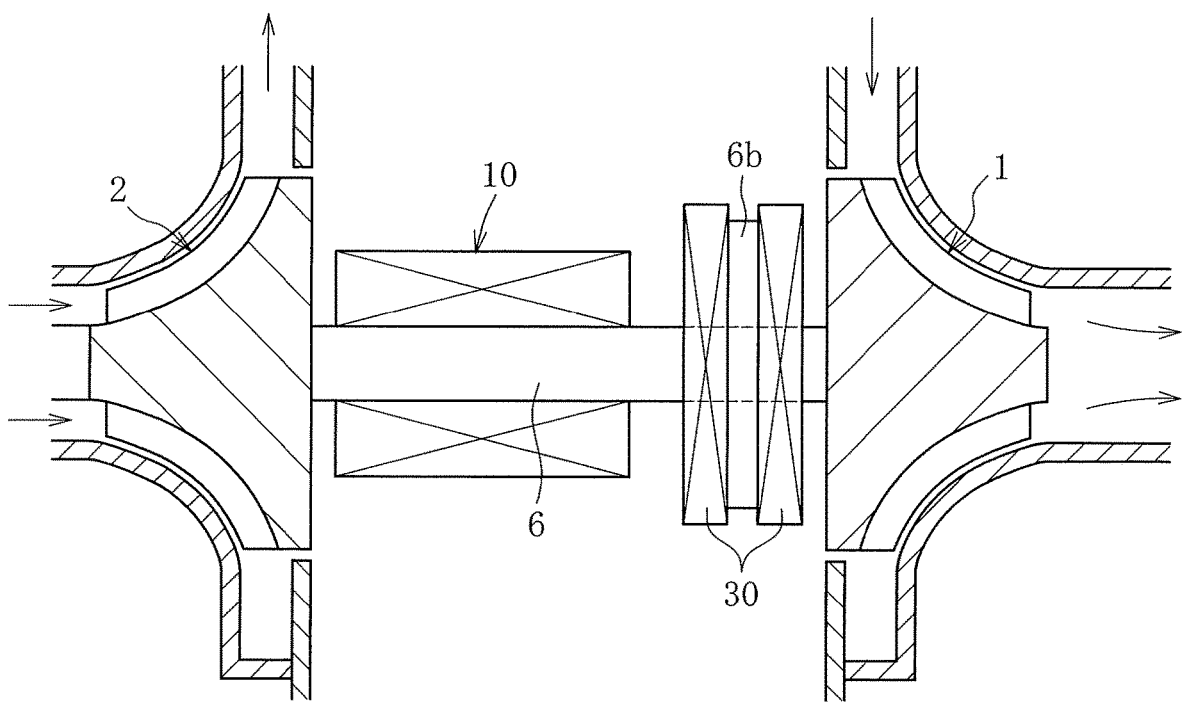
FIG. 2 is a view for illustrating a schematic configuration of a rotor support structure in the micro gas turbine.

In FIG. 2, one example of a support structure for the rotor in the micro gas turbine illustrated in FIG. 1 is conceptually illustrated. In this support structure, a radial bearing 10 is arranged at a periphery of the shaft 6, and thrust bearings 30 are arranged on both sides of a flange portion 6b arranged on the shaft 6 in an axial direction thereof. The shaft 6 is supported by those radial bearing 10 and thrust bearings 30 rotatably in both a radial direction and a thrust direction. In this support structure, a region between the turbine 1 and the compressor 2 has a high-temperature atmosphere because the region is adjacent to the turbine 1, which is rotated by the high-temperature and high-pressure gas. In addition, the shaft 6 is rotated at a rotation speed of several ten thousand rpm or higher. Therefore, as the bearings 10 and 30 to be used in this support structure, air dynamic pressure bearings or, in particular, foil bearings are suitable.

In the following, a foil bearing which is an embodiment of the present invention and is suitable for the radial bearing 10 to be used for the above-mentioned micro gas turbine is described with reference to the drawings.

Figure 3:
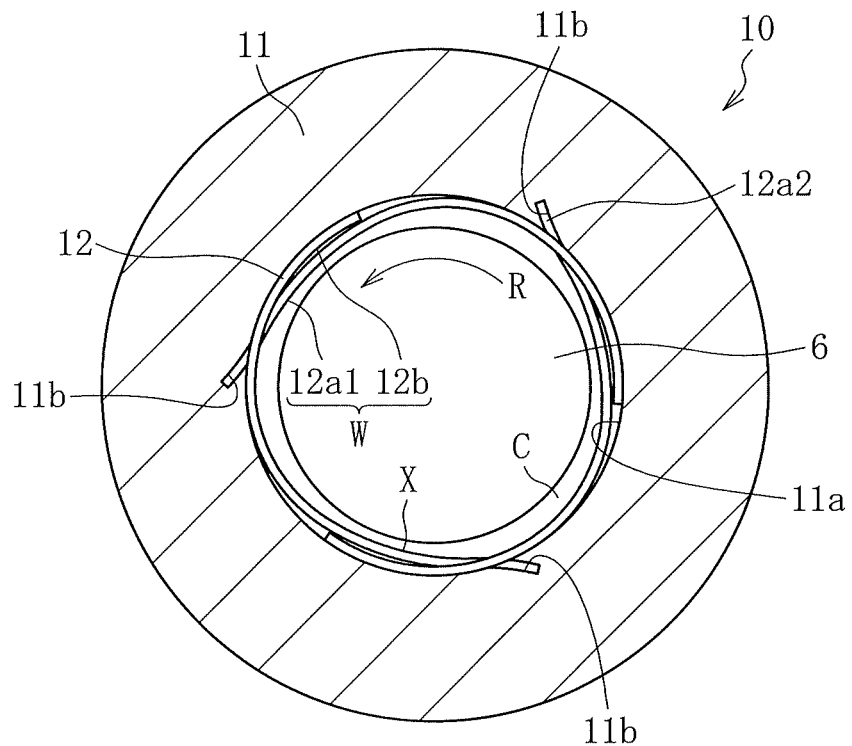
FIG. 3 is a sectional view for illustrating a foil bearing according to an embodiment of the present invention.

As illustrated in FIG. 3, the radial foil bearing 10 comprises a foil holder 11 and foils 12. The foil holder 11 has an inner peripheral surface 11a having a cylindrical surface shape. The foils 12 are arranged at a plurality of positions in a rotation direction of the shaft 6 on the inner peripheral surface 11a of the foil holder 11. The foil bearing 10 of the illustrated example is a foil bearing of so-called multi-arc type in which three foils 12 are arrayed in a circumferential direction on the inner peripheral surface 11a. The shaft 6 is inserted on a radially inner side of the foils 12.

The foil holder 11 may be made of metal (for example, steel material) such as sintered metal or ingot material. At a plurality of positions (the same number as the number of foils) apart from each other in a rotation direction R in the inner peripheral surface 11a of the foil holder 11, there are formed axial grooves 11b serving as mounting portions for the foils 12.

The foils 12 are each formed by processing a band-like foil having a thickness of from about 20 μm to about 200 μm, which is made of metal having sufficient resiliency and exhibiting high processability such as steel material or copper alloy, into a predetermined shape, for example, by press working. As a representative example of steel material or copper alloy, carbon steel or brass may be given. However, with the general carbon steel, a rust-prevention effect with oil cannot be expected due to absence of lubricating oil in the atmosphere, with the result that corrosion caused by rust is liable to occur. Further, with the brass, there is a case in which delayed crack is formed due to machining strain (as the amount of Zn contained in the brass is larger, such tendency becomes more conspicuous). Therefore, it is preferred that a band-like foil being made of stainless steel or bronze be used.

Figure 4:
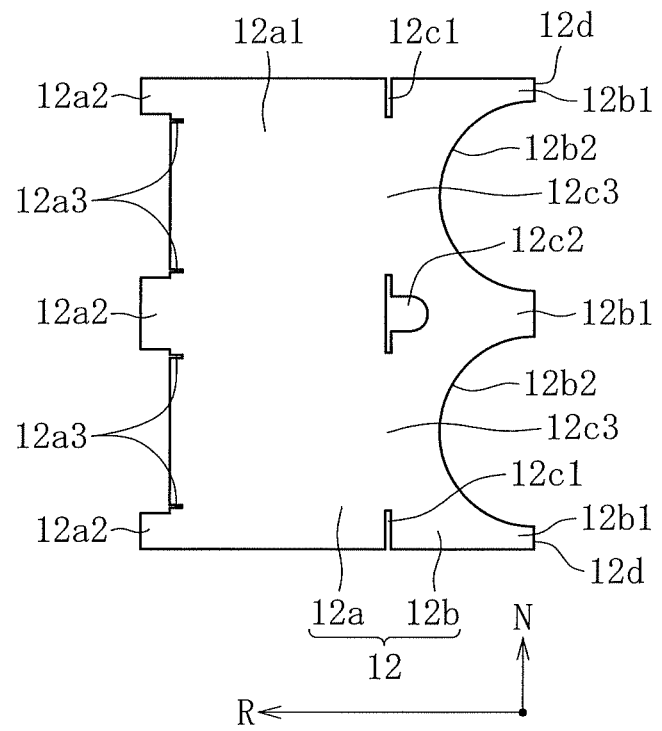
FIG. 4 is a plan view of a foil.

As illustrated in FIG. 4, the foil 12 comprises a first region 12a on the rotation direction R side of the shaft 6 and a second region 12b on the side opposite to the rotation direction side.

The first region 12a comprises a top foil portion 12a1 and protrusion portions 12a2. The top foil portion 12a1 forms a bearing surface X. The protrusion portions 12a2 are formed at both ends and a center in a direction N along a surface of the top foil portion 12a1 and orthogonal to the rotation direction R (hereinafter simply "referred to as orthogonal direction N"), and protrude in the rotation direction R. At base end portions of the protrusion portions 12a2, there are formed minute slits 12a3 extending from foil edge portions in a direction opposite to the rotation direction.

At a rear end 12d (end portion on the side opposite to the rotation direction side) of the second region 12b, there are formed two cutout portions 12b2, which are arranged apart in the orthogonal direction N and are recessed in the rotation direction R. A width dimension of each cutout portion 12b2 in the orthogonal direction N gradually decreases toward the rotation direction R. In this embodiment, illustration is made of the case in which each cutout portion 12b2 is entirely formed into an arc shape. However, each cutout portion 12b2 may be formed into a substantially V-shape with a sharp end at a top portion. On both sides of each cutout portion 12b2 in the orthogonal direction, there are formed protruding portions 12b1 protruding in the direction opposite to the rotation direction.

In a boundary between the first region 12a and the second region 12b, at both ends and a center in the orthogonal direction N, there are formed insertion slots 12c1, 12c2, and 12c1 to which protrusion portions 12a2 of the adjacent foils 12 are inserted. Among those, the insertion slots 12c1 at both ends linearly extend in the orthogonal direction N and are opened at both end portions of the foil 12. The insertion slot 12c2 at the center comprises a linear cutout portion and a large-width cutout portion. The linear cutout portion extends along the orthogonal direction N. The large-width cutout portion extends from the cutout portion toward the side opposite to the rotation direction side and has an arc-shaped distal end. The first region 12a and the second region 12b are coupled to each other by regions 12c3 connecting the insertion slots 12c1, 12c2, and 12c1 to one another.

Figure 5:
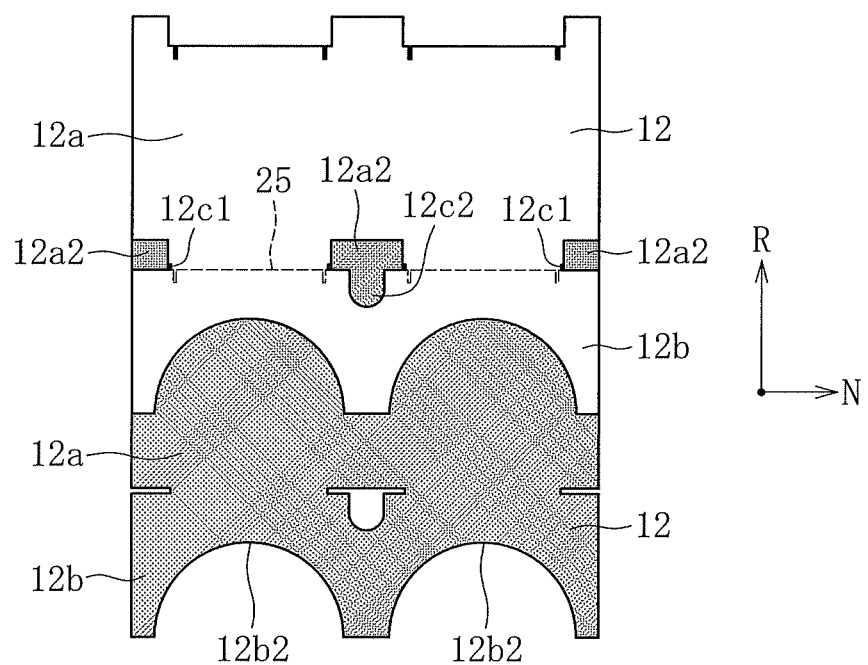
FIG. 5 is a plan view of two foils coupled to each other as seen from a back surface side.

As illustrated in FIG. 5, the protrusion portions 12a2, 12a2, and 12a2 of one foil 12 are inserted to the insertion slots 12c1, 12c2, and 12c1 of the adjacent foil 12, respectively, thereby being capable of coupling the two foils 12 to each other. In FIG. 5, one foil 12 of the two assembled foils 12 is colored gray.

Figure 6:
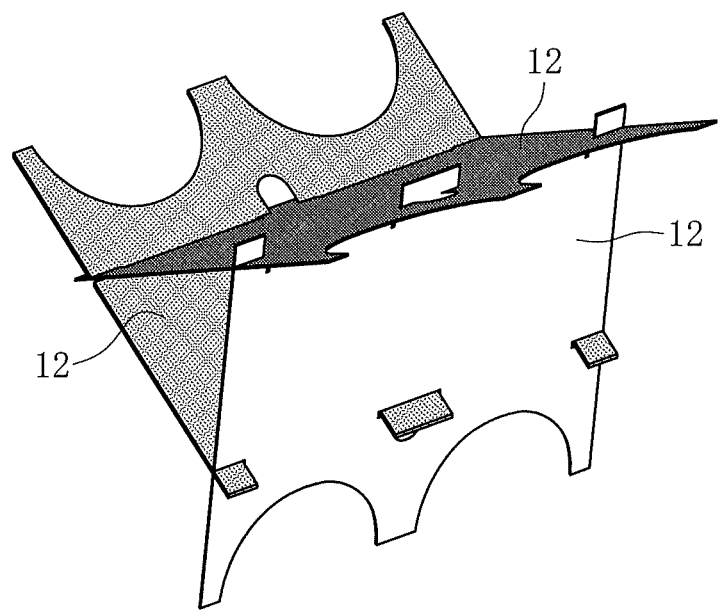
FIG. 6 is a perspective view for illustrating a state in which three foils are temporarily assembled.
Figure 7:
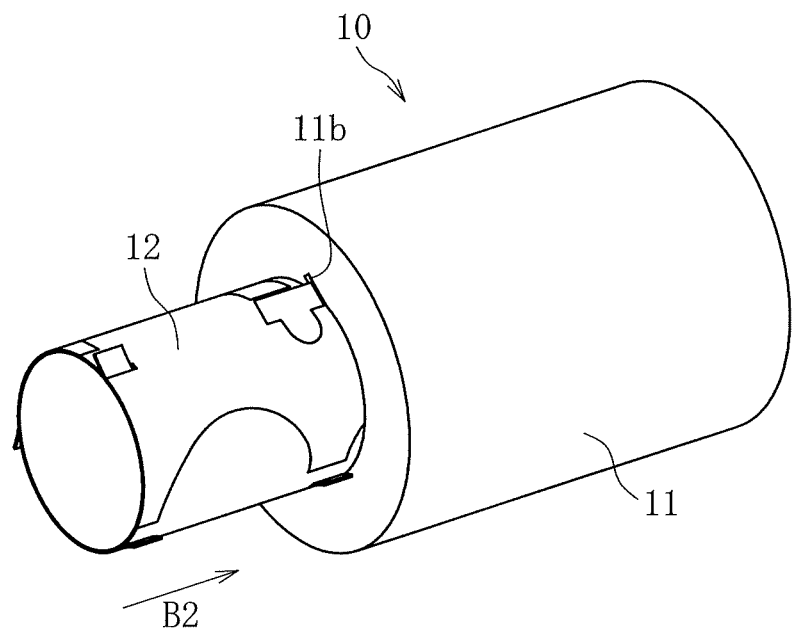
FIG. 7 is a perspective view for illustrating a state of mounting the temporarily assembled body of the foils to a foil holder.

Further, as illustrated in FIG. 6, three foils 12 are coupled to one another to form a shape extending in a circumferential direction by a coupling method similar to that of FIG. 5, thereby being capable of temporarily assembling the foils 12. As illustrated in FIG. 7, the temporarily assembled body is formed into a cylindrical shape, and is inserted along an inner periphery of the foil holder 11 in the direction indicated by the arrow B2. As a result, the foil bearing 10 is assembled. Specifically, while the temporarily assembled body of the three foils 12 is inserted along the inner periphery of the foil holder 11, the protrusion portions 12a2 of the foils 12 are inserted to the axial grooves 11b (see FIG. 7) which are opened at one end surface of the foil holder 11 from one side in the axial direction. In the manner as described above, the three foils 12 are mounted to the inner peripheral surface 11a of the foil holder 11 in a state of being arrayed in the rotation direction R.

Figure 8:
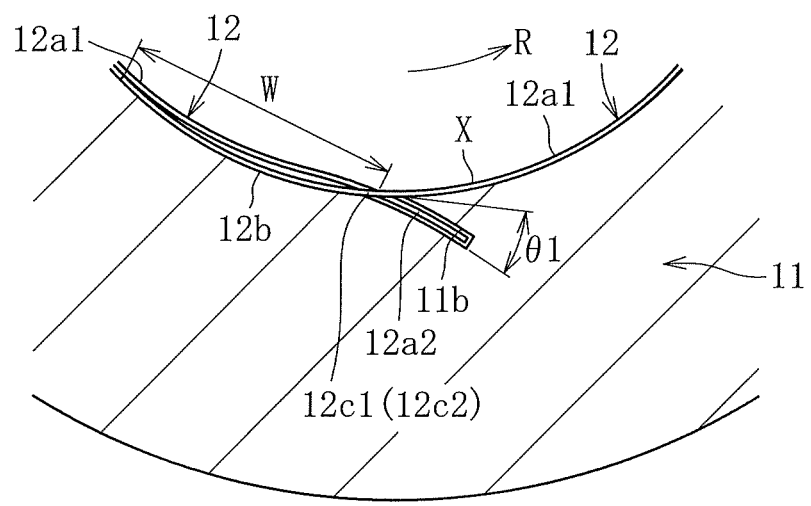
FIG. 8 is an enlarged sectional view for illustrating a foil overlapping portion.

In this state, as illustrated in FIG. 8, the protrusion portions 12a2 formed at the end portion of each foil 12 in the rotation direction R are held by the foil holder 11 on the back side of the adjacent foil 12. Specifically, the protrusion portions 12a2 of each foil 12 are fitted to the axial groove 11b of the foil holder 11 through the insertion slots 12c1 (12c2) of the adjacent foil 12. The second region 12b of each foil 12, which is located on the side opposite to the rotation direction side, is arranged between the top foil portion 12a1 of the adjacent foil 12 and the inner peripheral surface 11a of the foil holder 11 to form an under-foil portion. The under-foil portion 12b functions as a support portion configured to elastically support the top foil portion 12a1 of the adjacent foil 12 from the back side. An overlapping portion of the top foil portion 12a1 and the under-foil portion 12b forms a foil overlapping portion W. The foil overlapping portion W is formed at each of a plurality of positions (three positions in this embodiment) in the rotation direction R.

In this foil bearing 10, as illustrated in FIG. 3, one end (protrusion portions 12a2) on the rotation direction R side of each foil 12 is mounted to the foil holder 11, and the region on the side opposite to the rotation direction side is engaged with another foil 12. With such a configuration, the adjacent foils 12 are held in abutment against each other in the rotation direction R. Thus, the top foil portion 12a1 of each foil 12 projects toward the foil holder 11 side and is curved into a shape extending along the inner peripheral surface 11a of the foil holder 11. The movement of each foil 12 toward the rotation direction R side is regulated by abutment of the protrusion portions 12a2 of each foil 12 against the axial groove 11b. However, the movement of each foil 12 toward the side opposite to the rotation direction side is not regulated, and hence each foil 12 is in a state of being movable in the direction opposite to the rotation direction.

As illustrated in FIG. 8, the axial groove 11b is formed so as to be inclined by an angle θ1 with respect to a tangential direction of the inner peripheral surface of the foil holder 11. Thus, in the vicinity of the protrusion portions 12a2 inserted to the axial groove 11, the top foil portion 12a1 tends to curve in a direction reverse to an overall curve direction of the foil 12 (curve direction of the inner peripheral surface 11a of the foil holder 11). Further, the top foil portion 12a1 is placed over the under-foil portion 12b so as to stand in a state of being inclined in a direction away from the inner peripheral surface 11a of the foil holder 11. With those actions, the top foil portion 12a1 is brought into a state of being elastically supported by the foil holder 11, and hence the top foil portion 12a1 is deformable along with, for example, displacement or thermal expansion of the shaft 6.

As illustrated in FIG. 3, during rotation of the shaft 6 in one direction, a wedge-shaped space is formed between the bearing surface X of the top foil portion 12a1 and the outer peripheral surface of the shaft 6. The pressure of an air film generated in the wedge-shaped space causes the shaft 6 to receive a floating force. Thus, an annular radial bearing gap C is formed between the bearing surface X of each foil 12 and the shaft 6, and the shaft 6 is rotatably supported in a non-contact state with respect to the foil 12. Through elastic deformation of the top foil portions 12a1, the gap width of the radial bearing gap C is automatically adjusted to an appropriate width in accordance with, for example, an operation condition. Thus, rotation of the shaft 6 is stably supported. In FIG. 3, the gap width of the radial bearing gap C is depicted with emphasis for easy understanding (this similarly applies to FIG. 9, FIG. 10, FIG. 12, FIG. 17, and FIG. 20 to FIG. 22).

Figure 9:
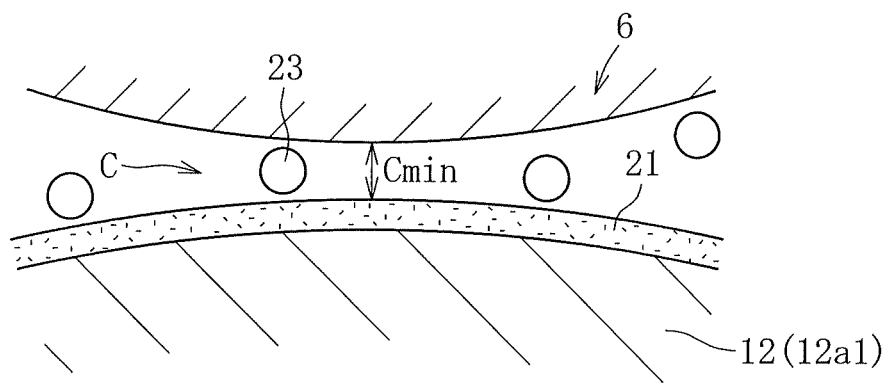
FIG. 9 is an enlarged sectional view for illustrating a top foil portion (in a normal rotation state of the shaft).

As mentioned above, in the foil bearing 10, the top foil portions 12a1 and the outer peripheral surface of the shaft 6 are brought into contact with each other immediately after the start of rotation of the shaft 6 and immediately before the stop of the shaft 6. In order to improve abrasion resistance and lubricity at the contact portion, as illustrated in FIG. 9, a coating film 21 is formed on any one of or both of the outer peripheral surface of the shaft 6 and each surface (surface opposed to the shaft) of the top foil portions 12a1 which are opposed to each other through the bearing gap C (in FIG. 9, illustration is made of the case in which the coating film 21 is formed on the surface of the top foil portion 12a1). As the coating film 21, there may be used, for example, a DLC film, a titanium aluminum nitride film, a tungsten disulfide film, a molybdenum disulfide film, or a resin film. The coating film 21 is formed at least on the surface of the top foil portion 12a1. However, in some cases, the coating film 21 is formed on a surface of the foil 12 other than the top foil portion 12a1 (for example, an entire surface including a back surface of the foil 12). Further, there is also a case in which the coating film 21 is formed on the inner peripheral surface 11a of the foil holder 11.

In the foil bearing 10 according to the present invention, a large number of particles 23 are supplied to the radial bearing gap C at the time point of completion of the assembly of the foil bearing 10. As illustrated in FIG. 9, during rotation of the shaft 6, the particles 23 float and flow in the radial bearing gap C.

Figure 10:
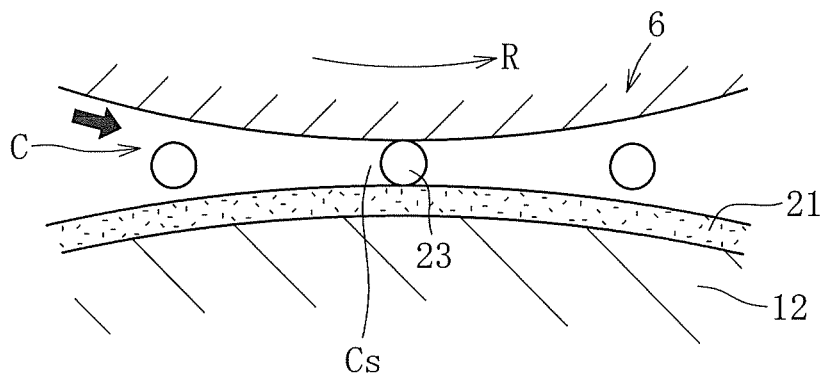
FIG. 10 is an enlarged sectional view for illustrating the top foil portion (immediately after start of rotation of the shaft).

As illustrated in FIG. 10, during the stop of the shaft 6, the particles 23 are interposed between two surfaces (in this embodiment, between the outer peripheral surface of the shaft 6 and the surface of the coating film 21) opposed to each other through the radial bearing gap C to function as a spacer. Thus, a minute gap Cs is formed between the two surfaces. Unlike the related-art structure illustrated in FIG. 19, the two surfaces are not brought into close contact with each other. Therefore, air is likely to be drawn into the minute gap Cs from the timing immediately after the start of rotation of the shaft 6 (flow of air is indicated by the solid arrow in FIG. 10), thereby being capable of promptly generating sufficient air pressure (dynamic pressure) in the wedge-shaped space and allowing the shaft 6 to float. Thus, the shaft 6 can be promptly shifted to the normal rotation.

Even when the particles 23 are bitten into a space between the two surfaces forming the bearing gap C during rotation of the shaft 6, the particles 23 roll along with the rotation of the shaft 6, thereby being capable of reducing a friction force generated between the foil 12 and the shaft 6. Thus, even when abrasion of the coating film 21 proceeds, rapid abrasion of the surface of the top foil portion 12a1 or the outer peripheral surface of the shaft 6 does not occur. The both surfaces are mildly abraded as described above, and hence the top foil portion 12a1 or the shaft 6 does not immediately suffer from critical damage (for example, adhesion or seizure). Abrasion powder formed by the mild abrasion or abrasion powder of the coating film 21 has the same function as the particles 23 described above, and form the minute gap Cs during the stop of the shaft 6. Therefore, even when the number of particles 23 in the bearing gap C is reduced by some factors, the shaft 6 can be promptly shifted to the normal rotation. When both the shaft 6 and the foil 12 are made of steel material, abrasion powder caused by abrasion of those members is immediately oxidized to form iron oxide.

When a hardness of the particles 23 is higher than a hardness of the surface of the top foil portion 12a1 or the outer peripheral surface of the shaft 6, the particles 23 function as abrasive grains, thereby promoting formation of abrasion powder of a base material (including oxide powder formed through oxidization of the abrasion powder). As described above, this abrasion powder contributes to formation of the gap Cs at the time of activation. Therefore, there is no particular problem in promoting formation of the abrasion powder. When the hardness of the particles 23 is approximately equal to or is equal to or less than that of the surface of the top foil portion 12a1 or the surface of the shaft 6, the particles 23 are less liable to be bitten between the surface of the top foil portion 12a1 and the surface of the shaft 6, thereby being capable of suppressing the unstable behavior (for example, change in rotation torque) of the shaft 6. Thus, there is no particular limitation on a material of the particles 23, and a wide variety of powders may be used. For example, there may be used powder of metal oxide such as iron oxide ($Fe_2O_3$) or alumina ($Al_2O_3$), powder of sulfide such as molybdenum sulfide ($MoS_2$) or tungsten sulfide ($WS_2$), powder of soft metal such as copper (Cu), silver (Ag), tin (Sn), or zinc (Zn), or copper-based powder as represented by graphite powder. Among the powders exemplified above, only one kind of powder may be used, or a mixture of a plurality of kinds of powders may be used.

In particular, in a case in which a steel material is used as materials for the foil 12 and the shaft 6, when the iron oxide is used for the particles 23, a main element (Fe) of the particles is in common with a main element included in the materials of the foil 12 and the shaft 6. In this case, abrasion powder (oxidized abrasion powder) formed from the foil 12 or the shaft member 6 has a composition similar to that of the particles 23, and exhibits a function similar to that of the particles 23. Thus, management of the minute gap Cs can be more easily performed, thereby being capable of stably shifting the shaft 6 to the normal rotation state. Further, when particles which are excellent in lubricity, for example, copper powder is used as the particles 23, a friction force generated at the slide contact portion between the shaft 6 and the top foil portion 12a1 is reduced, thereby being capable of suppressing the unstable behavior of the shaft.

As described above, in consideration of an effect which is to be regarded as being important, the particles 23 can be formed of a material which is the same as one or both of the materials of the foil 12 and the shaft 6 (material having the main element in common), or can be formed of a dissimilar material which is different from any of the materials of the foil 12 and the shaft 6 (material having different main element).

It is preferred that the particle diameter of the particles 23 be set smaller than a minimum width Cmin of the bearing gap C. Specifically, the particles 23 are selected so that an average particle diameter of the particles 23 given by measurement through a laser diffraction-scattering method is set smaller than the minimum width Cmin of the bearing gap C. With this configuration, during the normal rotation of the shaft 6, the particles 23 smoothly pass through the minimum width portion of the bearing gap C, thereby being capable of reducing the unstable behavior of the shaft 6. Further, it is preferred that the particles 23 be selected so that the average particle diameter of the particles 23 is equal to or larger than a surface roughness (arithmetic average roughness defined by JIS B 0601) of the shaft 6 or the top foil portion 12a1.

Incidentally, when the particles 23 are caused to flow and float in the bearing gap C as described above, it is necessary to prevent leakage of the particles 23 from the bearing gap C by some means. As a leakage prevention structure, when a contact-type seal used in a sealing device for a rolling bearing or the like is used, torque loss increases. Further, under a high-temperature environment such as a vicinity of the turbine, there is a fear in that the seal member is degraded in an early stage, with the result that the sealing function is impaired. Meanwhile, with a non-contact seal using a labyrinth gap or the like, in relation to thermal expansion due to the use under a high-temperature environment, there is difficulty in management of the gap width, with the result that it becomes difficult to attain the stable sealing function.

In view of the above-mentioned circumstance, according to the present invention, the flow of air in the bearing gap C is actively controlled, to thereby prevent the leakage of the particles 23 from the bearing gap C.

Figure 11:
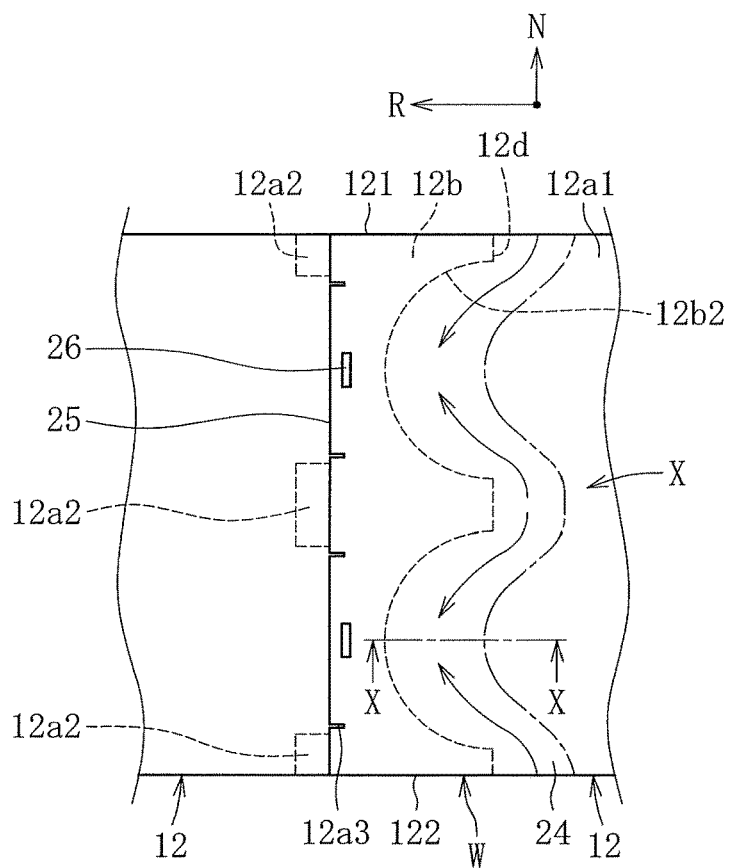
FIG. 11 is a plan view for illustrating two foils coupled to each other as seen from a front surface side.

FIG. 11 is an illustration of a specific example of this conception, and is a plan view for illustrating the coupled body of the two foils 12 illustrated in FIG. 5 as seen from a front surface side opposite to the side illustrated in FIG. 5. As illustrated in FIG. 11, according to the present invention, a fluid control portion 24 is formed in the top foil portion 12a1. The fluid control portion 24 is configured to generate an air flow from both end portions 121 and 122 in the orthogonal direction toward a region between the both end portions.

Figure 12:
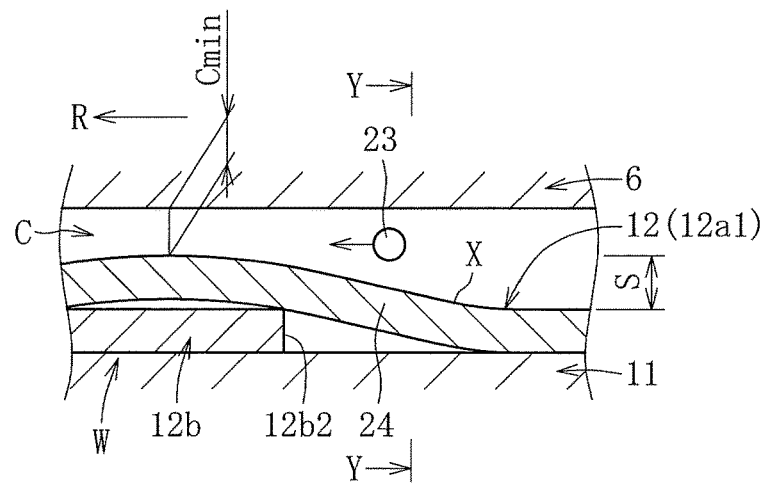
FIG. 12 is an enlarged sectional view taken along the line X-X in FIG. 11.

FIG. 12 is an enlarged sectional view taken along the line X-X in FIG. 11. As illustrated in FIG. 12, the fluid control portion 24 may be formed of, for example, a tapered step portion formed in the surface of the top foil portion 12a1. The step portion 24 includes a step S in the width direction of the bearing gap C. As mentioned above, in the foil overlapping portion W, the top foil portion 12a1 is placed over the under-foil portion 12b. Therefore, the step S is formed in a periphery of a region of the top foil portion 12a1 overlapping with the rear end 12d of the under-foil portion 12b. During rotation of the shaft 6, the top foil portion 12a1 is pressed against the under-foil portion 12b by the fluid pressure. Thus, the top foil portion 12a1 is elastically deformed in conformity with the shape of the cutout portion 12b2 (see FIG. 2) formed at the rear end 12d of the under-foil portion 12b. The slits 12a3 are formed in the top foil portion 12a1, and the rigidity of the top foil portion 12a1 is reduced by the slits 12a3, thereby being capable of elastically deforming the top foil portion 12a1 smoothly.

Figure 13:
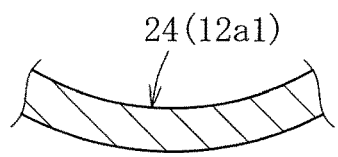
FIG. 13 is a sectional view taken along the line Y-Y in FIG. 12.

The cutout portion 12b2 has a shape of being recessed toward the rotation direction R side. Therefore, at this time, as seen in section in the orthogonal direction N (section taken along the line Y-Y in FIG. 12), as illustrated in FIG. 13, the top foil portion 12a1 is deformed into a recessed shape having a bottom along a center line passing through a top of the cutout portion 12b2. The one-dot chain line in FIG. 11 represents one example of a level contour line of the step portion 24 having the above-mentioned form.

Through formation of the step portion 24 having such a form in the top foil portion 12a1, during the rotation of the shaft 6, as illustrated in FIG. 11, the air flow (indicated by the arrows) in a direction inclined with respect to the orthogonal direction N from the both ends 121 and 122 of the top foil portion 12a1 to the region between the both ends 121 and 122 is generated in the bearing gap C facing the step portion 24. The particles 23 in the bearing gap C flow in the bearing gap C on the above-mentioned air flow, thereby being capable of preventing leakage of the particles 23 to the outside of the bearing gap C. During the stop of the shaft 6, for example, the Van der Waals force causes the particles 23 to adhere to the outer peripheral surface of the shaft 6 or the surface of the top foil portion 12a1, thereby suppressing the leakage of the particles 23 from the bearing gap C. With the actions described above, the particles 22 in the bearing gap C are not depleted even after use of the foil bearing 10 for a long period of time, thereby being capable of attaining the above-mentioned effect of the particles 23 for a long period of time.

Figure 14:
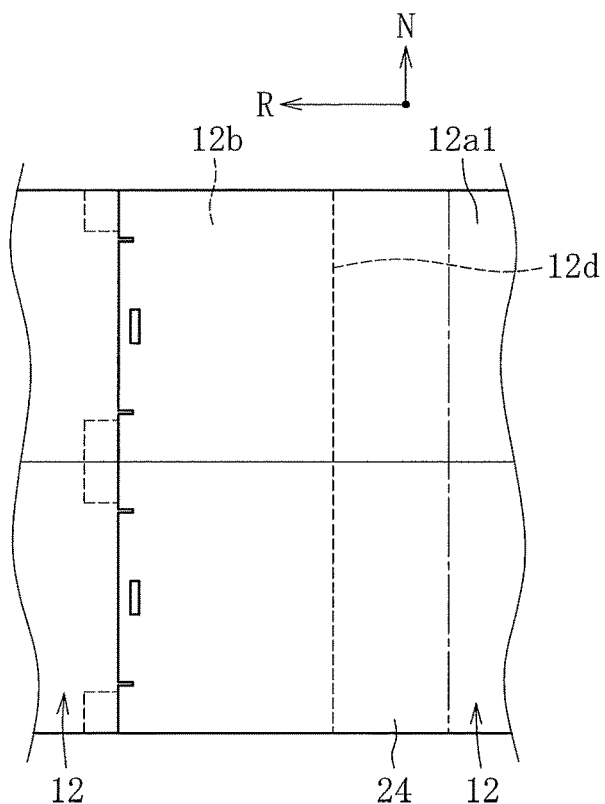
FIG. 14 is a plan view for illustrating two foils coupled to each other as seen from the front surface side.

In contrast, as illustrated in FIG. 14, when the cutout portions 12b2 are not formed in the under-foil portion 12b, and the rear end 12d of the under-foil portion 12b has a linear shape parallel to the orthogonal direction N, the inclined air flow illustrated in FIG. 11 is not generated, with the result that the above-mentioned effect cannot be attained.

In the foil bearing according to this embodiment, as illustrated in FIG. 12, in a periphery of the end portion of the step portion 24 on the rotation direction R side in the foil overlapping portion W, the bearing gap C has the minimum width Cmin. In the portion having the minimum width Cmin, a region intersecting the extension line of the top portion of each cutout portion 12b2 serves as a maximum pressure generating portion of the bearing gap C. In this embodiment, the maximum pressure generating portion is formed at each of two positions in the orthogonal direction N. Therefore, a moment load can be supported with one foil bearing 10.

Figure 15:
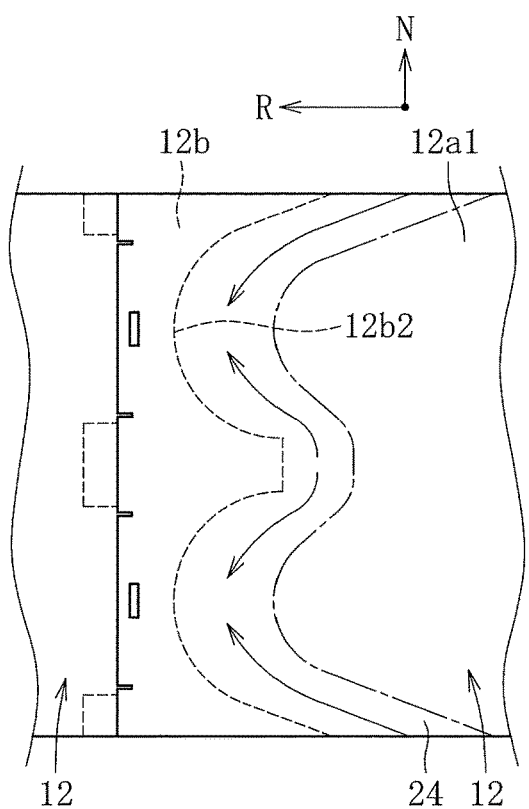
FIG. 15 is a plan view for illustrating two foils coupled to each other as seen from the front surface side.

In the embodiment illustrated in FIG. 11, the rear end 12d of the under-foil portion 12b, which is adjacent to the both end portions 121 and 122, is formed into a linear shape parallel to the orthogonal direction N. However, as illustrated in FIG. 15, the rear end 12d may be formed into an inclined shape smoothly connecting to the cutout portions 12b2 having the recessed shape so as to be integrated with the cutout portions 12b2. With this configuration, the inclination angle of the air flow in the periphery of the foil both end portions 121 and 122 is further increased as compared to the embodiment illustrated in FIG. 11, thereby being capable of more reliably preventing the leakage of the particles 23 to the outside of the bearing gap.

Figure 16:
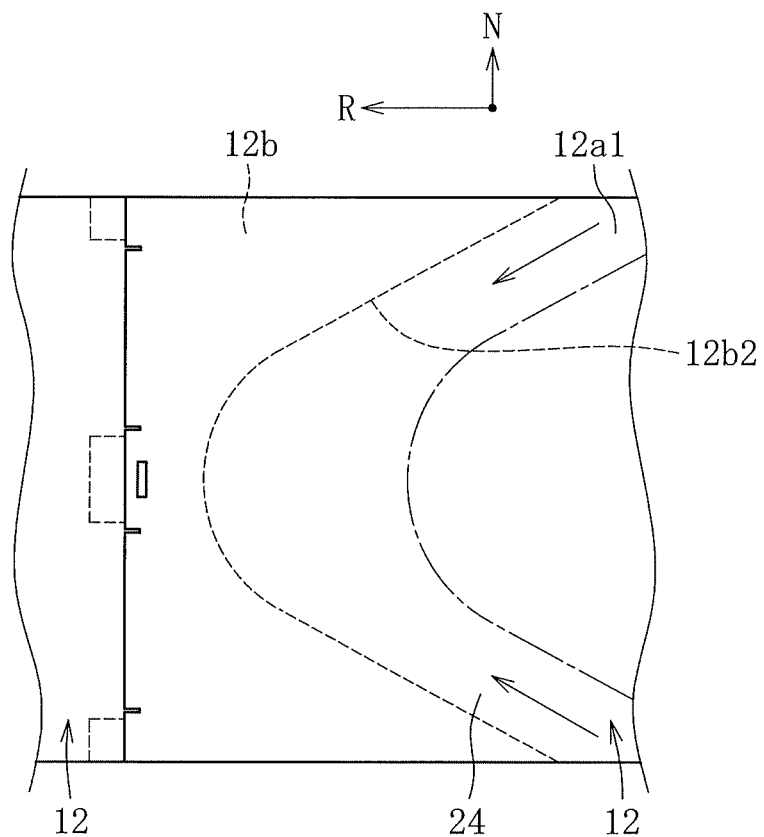
FIG. 16 is a plan view for illustrating two foils coupled to each other as seen from the front surface side.

Further, in the embodiment illustrated in FIG. 11, illustration is made of an exemplary case in which two cutout portions 12b2 are formed in the orthogonal direction N. However, the number of the cutout portions 12b2 may suitably be selected. As one example, in FIG. 16, there is illustrated a case in which the number of the cutout portions 12b2 is one. In this case, the maximum pressure generating portion in the radial bearing gap C is formed at only one position in the orthogonal direction N.

In the description above, description is made of an exemplary case in which the shape of the step portion 24 formed in the top foil portion 12a1 is controlled by forming the cutout portion 12b1 into a different shape. However, the shape of the step portion 24 can be controlled by any suitable method other than the above-mentioned method. For example, it is conceivable to employ a method of controlling the shape of the step portion 24 by forming a large number of protruding portions protruding in the width direction of the bearing gap C in the under-foil portion 12b and changing an arrangement pattern of the protruding portions, or a method of controlling the shape of the step portion 24 by embedding a large number of fiber bodies standing with respect to the inner peripheral surface 11a in the inner peripheral surface 11a of the foil holder 11 and changing a density pattern of the fiber bodies. The support portion configured to elastically support the top foil portion 12a1 with the protruding portions or the fiber bodies may be formed by any of the above-mentioned methods.

Next, another embodiment according to the present invention is described. As mentioned above, when the particles 23 are caused to flow and float in the bearing gap C, at the time of stop of the shaft 6, it is necessary to form the minute gap Cs by reliably interposing the particles 23 between the two surfaces forming the bearing gap C.

Figure 17:
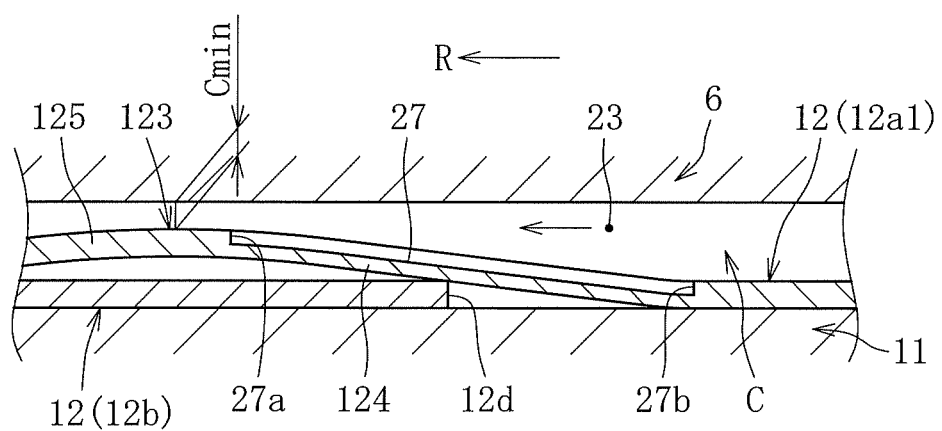
FIG. 17 is an enlarged sectional view for illustrating a bearing gap of the foil bearing.
Figure 18:
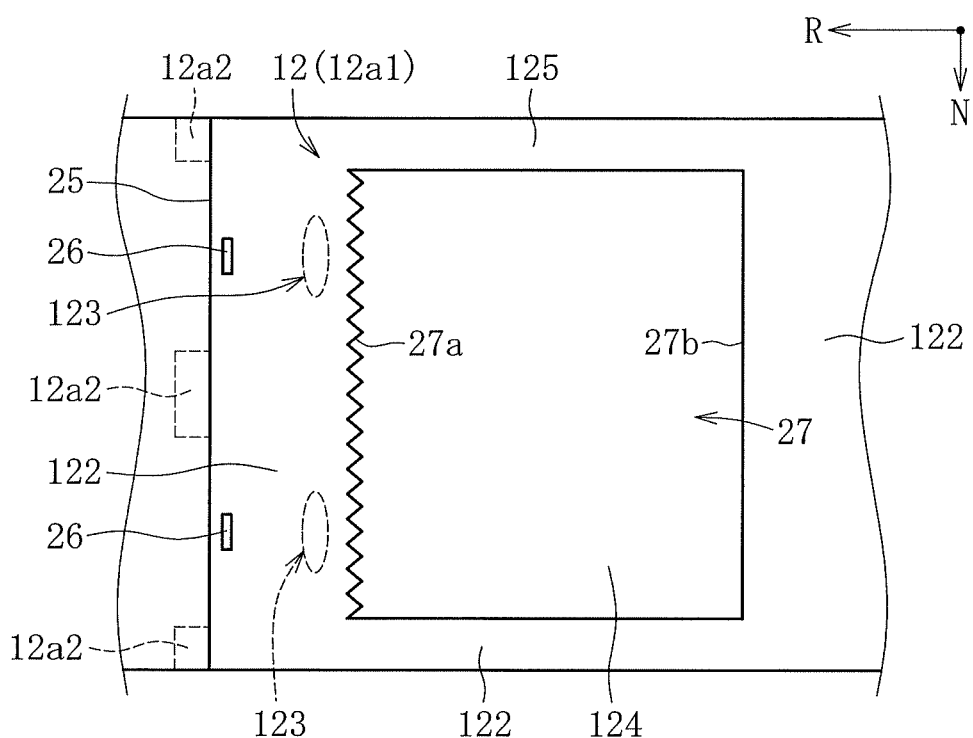
FIG. 18 is a plan view for illustrating two foils coupled to each other as seen from the front surface side.

In view of the above-mentioned problem, according to the present invention, the particles 23 are accumulated in a certain region on the surface of the top foil portion 12a1 so that the shaft 6 immediately before stop is likely to be brought into contact with the particles 23. A specific example of this conception is illustrated in FIG. 17 and FIG. 18. FIG. 17 is an enlarged sectional view for illustrating the bearing gap in a developed state. FIG. 18 is a plan view for illustrating the coupled body of the two foils 12 illustrated in FIG. 5 as seen from the front surface side opposite to the side illustrated in FIG. 5.

As illustrated in FIG. 17 and FIG. 18, the top foil portion 12a1 comprises a small-thickness portion 124 formed by partially removing the front surface side (bearing gap C side) of the top foil portion 12a1 and a large-thickness portion 125 having no such removed portion. Through formation of the top foil portion 12a1 so as to be partially small in thickness, a particle collecting portion 27 having the recessed sectional shape is formed in the surface of the top foil portion 12a1.

An end portion 27a of the particle collecting portion 27 on the rotation direction R side is formed so as to be close to a portion of the top foil portion 12a1 forming the minimum width Cmin of the bearing gap C, that is, to a maximum pressure generating portion 123, and is provided on the side opposite to the rotation direction side with respect to the maximum pressure generating portion 123. As illustrated in FIG. 18, the maximum pressure generating portion 123 is formed at each of two positions in the orthogonal direction N so as to correspond to the configuration in which the cutout portions 12b1 are formed into a double-row herringbone shape (see FIG. 4). There is no particular limitation on the position of an end portion 27b of the particle collecting portion 27 on the side opposite to the rotation direction side. However, in consideration of the collection efficiency for collecting the particles 23, it is preferred that a position of the end portion 27b be determined so that the portion deformed by being placed over at least the rear end 12d of the back foil portion 12d is included in the particle collecting portion 27. As illustrated in FIG. 18, it is preferred that the width dimension of the particle collecting portion 27 in the orthogonal direction N be determined so that, when contour lines of both ends of the particle collecting portion 27 in the orthogonal direction N are extended in the rotation direction R, the two maximum pressure generating portions 123 are included between the extension lines. The large-thickness portion 125 is formed on each of the rotation direction R side of the particle collecting portion 27, the side opposite to the rotation direction side, and both sides in the orthogonal direction N.

The particle collecting portion 27 mentioned above can be formed, for example, by removing a part of the surface of the foil 12 through a suitable method (for example, etching or grinding). Other than the above-mentioned method, the particle collecting portion 27 can be formed by adjusting a thickness of the coating film 21 (see FIG. 9) formed in the surface of the top foil portion 12a1 while forming the metal portion of the top foil portion 12a1 into an even thickness. Specifically, it is conceivable to set the thickness of the coating film 21 on the particle collecting portion 27 to be smaller than other parts, or to omit formation of the coating film 21 in the particle collecting portion 27.

Figure 19:
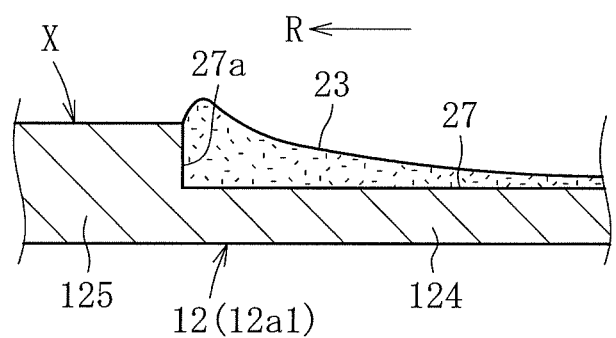
FIG. 19 is an enlarged sectional view for illustrating an end portion of a particle collecting portion on a rotation direction side.

During rotation of the shaft 6, the particles 23 flow and float on the air flow in the bearing gap C. At this time, the air flow stagnates in the particle collecting portion 27. Thus, as illustrated in FIG. 19, the particles 23 are collected and accumulated in the particle collecting portion 27. In particular, the particles 23 are likely to be accumulated in a periphery of the end portion 27a on the rotation direction R side. Therefore, in the periphery of the end portion 27a of the particle collecting portion 27, the particles 23 are accumulated in the state of rising beyond the bearing surface X. During rotation of the shaft 6, the particles 23 are collected in the particle collecting portion 27. Therefore, the total number of the particles 23 flowing in the bearing gap C is reduced. Thus, the unstable behavior of the shaft 6 caused by biting of the particles 23 can be prevented, or leakage of the particles 23 to the outside of the bearing gap C can be reduced.

Meanwhile, when the rotation of the shaft 6 is stopped, the shaft 6 having been eccentric due to the influence of the gravity immediately before the stop is brought into contact with the particles 23 accumulated in the particle collecting portion 27 (in particular, particles 23 accumulated in the vicinity of the end portion 27a in the rotation direction R). In particular, the end portion 27a of the particle collecting portion 27 on the rotation direction R side is a portion of the bearing gap C having a small width. Therefore, the shaft 6 having been eccentric becomes more likely to be brought into contact with the particles 23 in the periphery of the end portion 27a in the particle collecting portion 27. Further, the particles 23 are accumulated in the state of rising at the end portion 27a. Therefore, the shaft 6 becomes more likely to be brought into contact with the particles 23. Thus, at the time of complete stop of the shaft 6, a large number of particles 23 can be caused to adhere to the outer peripheral surface of the shaft 6. With this configuration, as illustrated in FIG. 10, after the complete stop of the shaft 6, the minute gap Cs can be formed by reliably interposing the particles 23 between the two surfaces forming the bearing gap C.

In particular, as illustrated in FIG. 18, when the end portion 27a of the particle collecting portion 27 on the rotation direction R side is formed into a protrusion-and-recess shape (saw-like shape), the amount of the particles 23 to be accumulated at the end portion 27a can be increased as compared to the case in which the end portion 27a is formed into a linear shape. Thus, the above-mentioned effect can be attained more reliably.

As mentioned above, during the rotation of the shaft 6, the top foil portion 12a1 is elastically deformed by the pressure of the air film in conformity with the shape of the cutout portion 12b1 of the under-foil portion 12b. Therefore, a recessed portion having a step is formed in the surface of the top foil portion 12a1, and it is conceivable that the particles 23 are collected in the recessed portion. However, when the shaft 6 is stopped, reduction in pressure immediately before the stop causes the top foil portion 12a1 to be elastically restored to a natural state, and the above-mentioned recessed portion is lost. Therefore, the particles 23 collected in the recessed portion are released to the bearing gap C. Thus, the particles 23 cannot be caused to sufficiently adhere to the outer peripheral surface of the shaft 6. In contrast, the particle collecting portion 27 of the present invention maintains the form of the recessed shape not only during the rotation of the shaft 6 but also during a period from deceleration to the stop of the shaft 6. That is, the particle collecting portion 27 is in a state of always being provided. This point is the difference in configuration and function of the particle collecting portion 27 of the present invention from the above-mentioned recessed portion.

Figure 20:
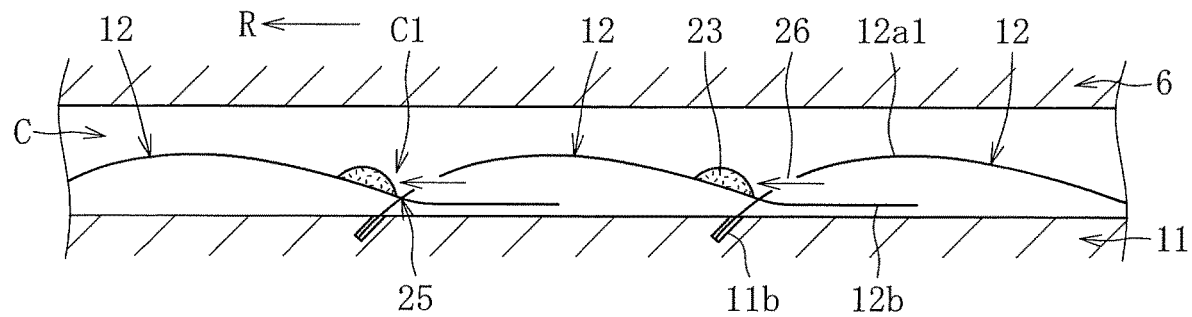
FIG. 20 is a sectional view for illustrating a radial foil bearing in a developed state.

Incidentally, as in the above-mentioned foil bearing 10, when the particles 23 are caused to flow in the bearing gap C, there is formed a region in which the particles 23 are likely to be accumulated at a certain position on the surface of the top foil portion 12a1 in addition to the particle collecting portion 27. For example, in the radial foil bearing 10 of the multi-arc type, as illustrated in FIG. 20, a large-width portion C1 having a width larger than the minimum width Cmin of the bearing gap C is formed in the bearing gap C in a periphery of the boundary portion 25 between the two adjacent foils 12. However, the large-width portion C1 is a region in which the air flow is stagnant (stagnates). Therefore, in the large-width portion C1, the particles 23 are liable to be accumulated, in particular, on the surface of the top foil portion 12a1 on the rotation direction side with respect to the boundary portion 25. When the particles 23 are accumulated at the certain position as described above, the number of particles 23 flowing in the bearing gap C is reduced by the amount of accumulation at the certain position. Thus, the above-mentioned effect of the particles 23 is reduced. In FIG. 20, the state in which each member is developed into a flat shape is illustrated for easy understanding.

In order to solve the problems described above, it is preferred that, as illustrated in FIG. 20, a flow hole 26 which penetrates through the front and back sides of the top foil 12a1 and is opened to the large-width portion C1 be formed in the top foil 12a1 on the side opposite to the rotation direction side with respect to the boundary portion 25 in the large-width portion C1. Through formation of the flow hole 26 as described above, at the time of the start of rotation of the shaft 6, air is drawn into the flow hole 26 from a space on the back side of the top foil portion 12a1 in a manner of being drawn by the flow of the air in the bearing gap C, and the air flow jets toward the large-width portion C1. The air flow blows the accumulated particles 23, and hence the particles 23 can flow in the bearing gap C again. Thus, the particles 23 can be reused, and effective use of the particles 23 can be achieved.

Figure 21:
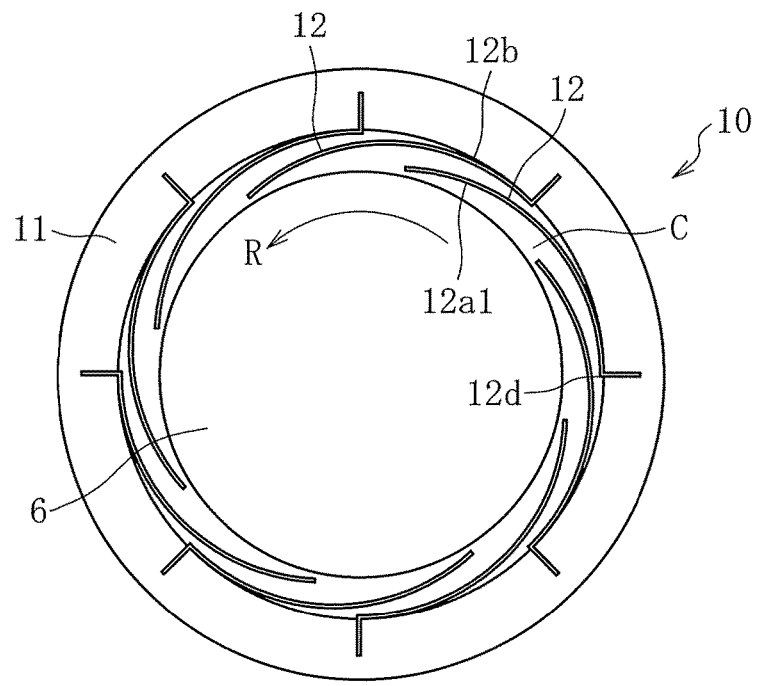
FIG. 21 is a sectional view for illustrating another embodiment of the radial foil bearing.
Figure 22:
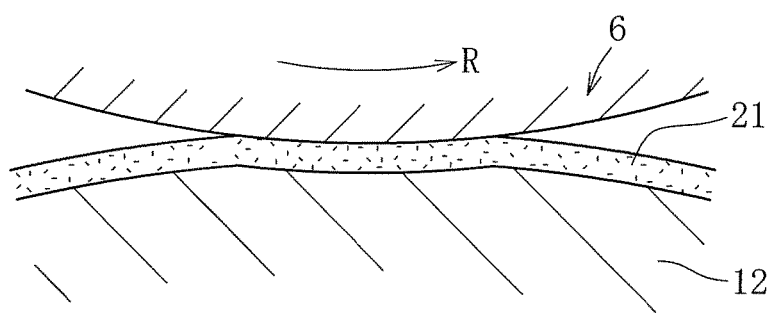
FIG. 22 is an enlarged sectional view for illustrating a top foil portion of a related-art foil bearing.

In the description above, the radial foil bearing of so-called multi-arc type is exemplified as the foil bearing. However, the mode of the foil bearing is not limited to the multi-arc type, and the present invention can be applied to foil bearings of any mode. For example, as illustrated in FIG. 21, the present invention can be applied also to a foil bearing of so-called leaf type in which the foils 12 arranged in the rotation direction R each have a free end at an end portion (front end) on the rotation direction R side. In the foil bearing of the leaf type, a region on the rotation direction R side in each of the leaves 12 mounted to the foil holder 11 forms the top foil portion 12a1, and a region on the side opposite to the rotary side forms the under-foil portion 12b (support portion) configured to support the top foil portion 12a1 on the back side of the top foil portion 12a1. The top foil portion 12a1 is placed over the under-foil portion 12b so that elasticity is given to the top foil portion 12a1. For example, a cutout portion is formed at the rear end 12d of the under-foil portion 12b to change the shape of the rear end 12d, thereby being capable of controlling the shape of the step portion 24. Further, the particle collecting portion 27 is formed in the surface of the top foil portion 12a1, thereby being capable of reliably interposing the particles 23 between the two surfaces forming the bearing gap C at the time of stop of the shaft 6. Although illustration is omitted, the present invention can be similarly applied to a thrust foil bearing (see the reference symbol 30 in FIG. 2) having a thrust bearing gap between the shaft 6 and the top foil portion.

Further in the description above, description is made of an exemplary case in which the shaft 6 is a rotary side member and the foil holder 11 is a stationary side member. However, in contrast, the present invention can be applied also to the case in which the shaft 6 is the stationary side member and the foil holder 11 is the rotary side member. However, in this case, the foil 12 is the rotary side member, and hence it is necessary to design the foil 12 in consideration of deformation of the entire foil 12 due to a centrifugal force.

Further, the foil bearing according to the present invention can be used not only as a foil bearing for the above-mentioned gas turbine but also as, for example, a foil bearing for supporting a rotor of a supercharger. The present invention is not limited to the examples described above, and the foil bearing according to the present invention can be widely used as a bearing for vehicles such as automobiles as well as a bearing for an industrial device. Further, the foil bearings of the embodiments are air dynamic pressure bearing using air as pressure-generating fluid. However, the present invention is not limited thereto, and other gas can be used as the pressure-generating fluid. Alternatively, liquid such as water or oil can also be used.

REFERENCE SIGNS LIST 6 shaft
10 foil bearing
11 foil holder
11a inner peripheral surface
11b axial groove (mounting portion)
12 foil
12a first region
12a1 top foil portion
12b second region (under-foil portion)
12b1 protruding portion
12b2 cutout portion
12d rear end
21 coating film
23 particle
25 boundary portion
26 flow hole
27 particle collecting portion
121, 122 both end portions
123 maximum pressure generating portion
124 small-thickness portion
125 large-thickness portion
C bearing gap
C1 large-width portion
R rotation direction
N direction along surface of top foil portion and orthogonal to rotation direction
X bearing surface

The invention claimed is:
1. A foil bearing comprising:
a plurality of foils, each of the foils including:
a top foil portion having a bearing surface which forms a bearing gap with a shaft to be supported; and
an under-foil portion arranged on a back side of the top foil portion,
wherein the foil bearing is configured to support relative rotation of the shaft in a non-contact state with fluid pressure generated in the bearing gap,
wherein particles are supplied to the bearing gap,
wherein the top foil portion of each of the foils comprises a fluid control portion which is configured to generate a fluid flow from both end portions of the top foil portion in a direction along a surface of the top foil portion and orthogonal to a direction of the relative rotation toward a region between both the end portions,
wherein the foils are arranged at a plurality of positions in the relative rotation direction,
wherein the under-foil portion of each of the foils is configured to elastically support the top foil portion of an adjacent one of the foils from a back side, and
wherein a cutout portion, which is recessed in the relative rotation direction, is formed at a rear end of each of the under-foil portions.

2. The foil bearing according to claim 1, wherein the fluid control portion of each of the foils is formed of a step in a width direction of the bearing gap.

3. The foil bearing according to claim 2, wherein the step is formed by elastically deforming the top foil portion of each of the foils in conformity with a shape of the under-foil portion of an adjacent one of the foils.

4. The foil bearing according to claim 1, wherein a particle diameter of the particles is set smaller than a minimum width of the bearing gap.

5. The foil bearing according to claim 1,
wherein a large-width portion, which is formed by setting a width of the bearing gap to be larger than a minimum width of the bearing gap, is formed at a boundary portion between the top foil portions of adjacent foils, and
wherein a flow hole which penetrates through front and back sides of the top foil portion of each of the foils and is opened to one of the large-width portions is formed in the top foil portion on a side opposite to a rotation direction side with respect to the one of the large-width portions.

6. A foil bearing comprising:
a top foil portion having a bearing surface which forms a bearing gap with a shaft to be supported; and
a support portion, which is arranged on a back side of the top foil portion, and is configured to elastically support another top foil portion,
wherein the foil bearing is configured to support relative rotation of the shaft in a non-contact state with fluid pressure generated in the bearing gap,
wherein particles are supplied to the bearing gap, and
wherein the top foil portion comprises a surface having a particle collecting portion which forms a recessed sectional shape.

7. The foil bearing according to claim 6, wherein the particle collecting portion is provided in a vicinity of a maximum pressure generating portion of the top foil portion and on a side opposite to a rotation direction side with respect to the maximum pressure generating portion.

8. The foil bearing according to claim 7, wherein the particle collecting portion is formed by partially reducing a thickness of the top foil portion.

9. The foil bearing according to claim 7, further comprising:
a plurality of foils arranged at a plurality of positions in a direction of the relative rotation,
wherein each of the foils has the top foil portion and an under-foil portion, as the support portion, configured to support the top foil portion of an adjacent one of the foils from a back side.

10. The foil bearing according to claim 6, wherein the particle collecting portion is formed by partially reducing a thickness of the top foil portion.

11. The foil bearing according to claim 10, further comprising:
a plurality of foils arranged at a plurality of positions in a direction of the relative rotation,
wherein each of the foils has the top foil portion and an under-foil portion, as the support portion, configured to support the top foil portion of an adjacent one of the foils from a back side.

12. The foil bearing according to claim 10, wherein protrusions and recesses are formed at an end portion of the particle collecting portion on a rotation direction side.

13. The foil bearing according to claim 12, further comprising:
a plurality of foils arranged at a plurality of positions in a direction of the relative rotation,
wherein each of the foils has the top foil portion and an under-foil portion, as the support portion, configured to support the top foil portion of an adjacent one of the foils from a back side.

14. The foil bearing according to claim 6, further comprising:
a plurality of foils arranged at a plurality of positions in a direction of the relative rotation,
wherein each of the foils has the top foil portion and an under-foil portion, as the support portion, configured to support the top foil portion of an adjacent one of the foils from a back side.

15. The foil bearing according to claim 6, wherein a particle diameter of the particles is set smaller than a minimum width of the bearing gap.

16. The foil bearing according to claim 6,
wherein the top foil portion is arranged at each of a plurality of positions in a direction of the relative rotation,
wherein a large-width portion, which is formed by setting a width of the bearing gap to be larger than a minimum width of the bearing gap, is formed at a boundary portion between adjacent pairs of the top foil portions, and
wherein a flow hole which penetrates through front and back sides of each of the top foil portions and is opened to one of the large-width portions is formed in the top foil portion on a side opposite to a rotation direction side with respect to the one of the large-width portions.

* * * * *